(12) United States Patent
Sarkar

(10) Patent No.: US 7,170,996 B1
(45) Date of Patent: Jan. 30, 2007

(54) RANDOM NUMBER GENERATION FOR ENCRYPTING CELLULAR COMMUNICATIONS

(75) Inventor: Sandip Sarkar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/419,968

(22) Filed: Oct. 18, 1999

(51) Int. Cl.
H04L 9/00 (2006.01)
H04K 1/00 (2006.01)

(52) U.S. Cl. .......................................... 380/46; 380/270
(58) Field of Classification Search ................ 380/239, 380/268, 270, 44, 46; 713/168, 44, 46; 375/316–320; 708/250–255
See application file for complete search history.

(56) References Cited

U.S. PATENT DOCUMENTS

| 4,484,027 A | * | 11/1984 | Lee et al. .................... 380/239 |
| 4,658,436 A | * | 4/1987 | Hill .............................. 380/31 |
| 5,481,611 A | * | 1/1996 | Owens et al. ............... 713/159 |
| 5,517,567 A | * | 5/1996 | Epstein ........................ 380/247 |
| 5,659,618 A | * | 8/1997 | Takahashi et al. ........... 380/255 |
| 5,781,541 A | * | 7/1998 | Schneider .................... 370/335 |
| 5,963,141 A | * | 10/1999 | Takamatsu .................... 340/340 |
| 6,038,266 A | * | 3/2000 | Lee et al. .................... 375/317 |
| 6,154,158 A | * | 11/2000 | Walker ........................ 341/118 |
| 6,278,783 B1 | * | 8/2001 | Kocher et al. .............. 380/277 |
| 6,339,645 B2 | * | 1/2002 | Smeets ......................... 380/46 |
| 6,430,170 B1 | * | 8/2002 | Saints et al. ................. 370/335 |

FOREIGN PATENT DOCUMENTS

EP 0781063 A 6/1997

OTHER PUBLICATIONS

Menezes,Oorschot,Vanstone, Handbook of Applied Cryptography, CRC press, pp. 171-173, 1997.*
M. Bertocco et al., "A noise model for quantized data," IMTC/98 Conference Proceedings. IEEE Instrumentation and Measurement Technology Confernece, vol. 2, May 21, 1998 (pp. 1243-1247).
Dixon, "Spread Spectrum Systems," Spread Spectrum Systems, New York, J. Wiley & Sons, US, 1994 (pp. 220-222, 254).

* cited by examiner

Primary Examiner—Hosuk Song
(74) Attorney, Agent, or Firm—Kam T. Tam; Thien Nguyen; Thomas Rouse

(57) ABSTRACT

In wireless communications, transmission devices require continuous supplies of random data for encryption processes. The invention provides a method for generating a continuos pool of truly random data with hardware that is already available in conventional CDMA phones.

3 Claims, 5 Drawing Sheets

RANDOM NUMBER GENERATION FOR ENCRYPTING CELLULAR COMMUNICATIONS

BACKGROUND OF THE INVENTION

I. Field of the Invention

The current invention relates to wireless communications networks. More specifically, the present invention relates to a novel and improved method of generating random data for the purpose of encrypting transmissions in wireless communications systems.

II. Description of the Related Art

Encryption schemes for wireless communications require continuous pools of random data. There are a number of ways to generate bits with good spectral properties through software. However, any software produced random number must be pseudo-random by its very nature rather than truly random, as all number sequences generated by software are periodic. Such psuedo-random sequences are susceptible to being deciphered by a third party. Only hardware generated data can be mathematically random. Although other techniques such as employing the voltage jitter from key presses or the time delay between key presses are known, the present invention has significant advantages over these techniques which are either pseudo-random or do not supply continuous random data.

Presently, there is no ideal method of continuously generating a sufficient supply of truly random data from existing wireless phone hardware for encrypting wireless communications.

SUMMARY OF THE INVENTION

The present invention is a novel and improved method for generating a continuous pool of random data bits for wireless communications encryption by employing hardware that is already available in conventional wireless phones. In particular, the present invention uses the random nature of the propagation path and the receiver front end, and their effect on the received signal characteristics, to generate a set of random numbers. The present invention is described in terms of a CDMA wireless phone, but the principles are readily adapted to other wireless modulation techniques.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
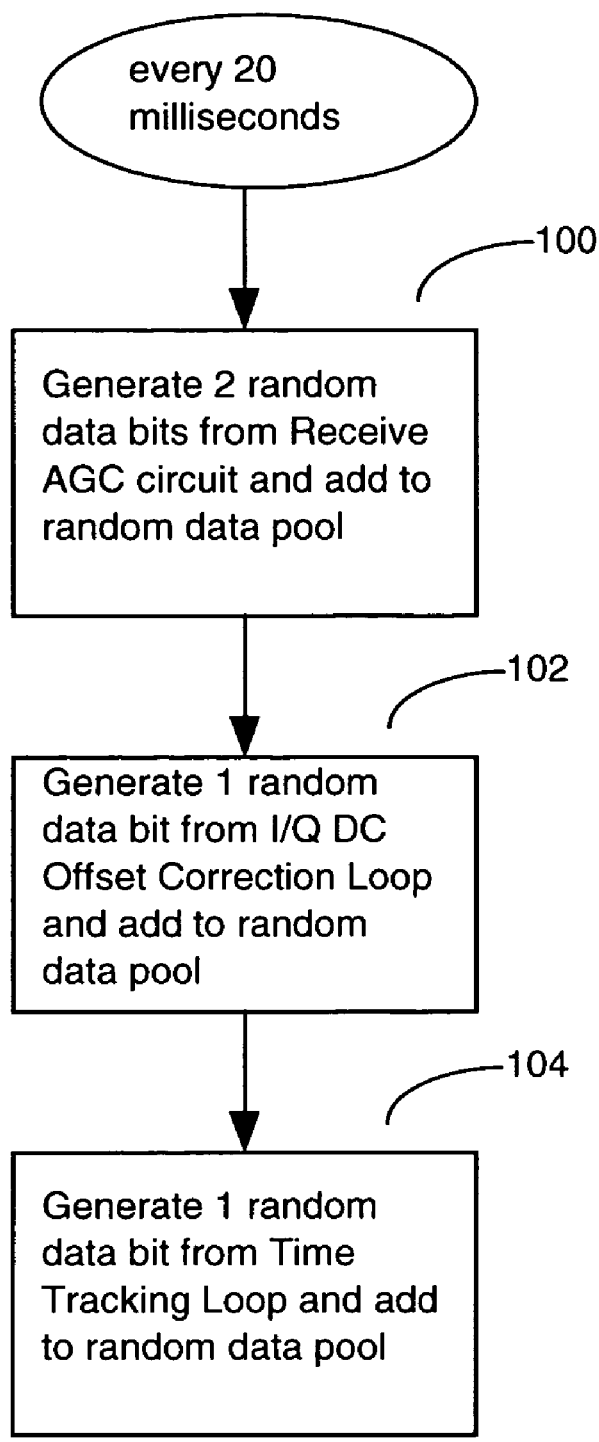
FIG. 1 is a high level flowchart diagram of the random data collection method of the present invention.

FIG. 1 shows a high level overview of the exemplary method for generating a pool of random data, often required for encryption, from common CDMA phone hardware. The method is readily amended by omission or re-ordering of the steps illustrated and without departing from the scope of the present invention. The present invention is described in the context of CDMA phones. However, the present invention will be equally applicable to other modulation techniques.

In current CDMA systems, data is transmitted in 20 millisecond frames. The method of the present invention is capable of producing four random data bits for each frame, equal to 20 milliseconds, using CDMA variables available during a normal phone call. The invention generates the data from truly random sources present in the received signal. These generated random data bits are collected in a random data pool and made available to encryption processes.

In block 100, in the exemplary embodiment, the Receive Automatic Gain Control (AGC) circuit of the CDMA phone is employed to generate two random bits of data every 20 milliseconds. Generation of random bits from the Receive AGC circuit is described in detail in FIG. 3. The Automatic Gain Control element is employed in wireless phones to keep the in-band energy presented to the demodulator at a fixed level. The received in-band energy fades in a random fashion due to changes in the propagation path from shadowing, fading and multi-path phenomenon. The received signal is normalized by means of a variable gain amplifier of the AGC to provide a first set of random bits. Because the gain of the variable gain amplifier varies continuously, one skilled in the art will understand that the random variable may be extracted at an arbitrary rate from the AGC. Moreover, more or less than two bits may be extracted in the random number generator.

In block 102, in the exemplary embodiment, the In Phase (I)/Quadrature Phase (Q) DC Offset Correction Loop of the CDMA phone is employed to generate one random data bit every 20 milliseconds. Generation of random bits from the DC Offset Correction Loop is described in detail in FIG. 4. The DC Offset Correction Loop element is employed in wireless phones to correct a small DC offset introduced to the received signal during analog to digital conversion 206. The DC offset is added to the digital signal in a random fashion due to effects of the conversion process on analog signal characteristics. The DC Offset Correction Loop normalizes the mean DC value of the converted signal to zero by means of gain amplification and summing, to provide an additional random bit. Because the DC offset varies continuously, one skilled in the art will understand that the random variable may be extracted at an arbitrary rate from the DC Offset Correction Loop. Moreover, more or less than one bit may be extracted in the random number generator.

In block 104, in the exemplary embodiment, the Time Tracking Loop of the CDMA phone is employed to generate one random bit every 20 milliseconds. Generation of random bits from the Time Tracking Loop is described in detail in FIG. 5. The Time Tracking Loop element is employed in wireless phones to maintain bit synchronization regardless of fluctuations in propagation path delays. Propagation path delays vary in a random fashion due to changes in the propagation path from shadowing, fading and multi-path phenomenon. The Time Tracking Loop samples and adjusts the received signal by means of summing and scaling, to provide an additional random bit. Because the propagation path delay varies randomly, one skilled in the art will understand that the random variable may be extracted at an arbitrary rate from the Time Tracking Loop. Moreover, more or less than one bit may be extracted in the random number generator.

Through novel use of the Receive AGC circuit, In Phase/Quadrature (I/Q) DC Offset Correction Loop, and Time Tracking Loop, the exemplary embodiment of the present invention produces 4 bits of random data per frame interval during phone use. Because the data is generated with hardware, it is truly random, rather than software generated data, which must be pseudo-random by nature. Such sequences of pseudo-random data are highly susceptible to being deciphered by a third party, while random data produced by the present invention is not.

Figure 2:
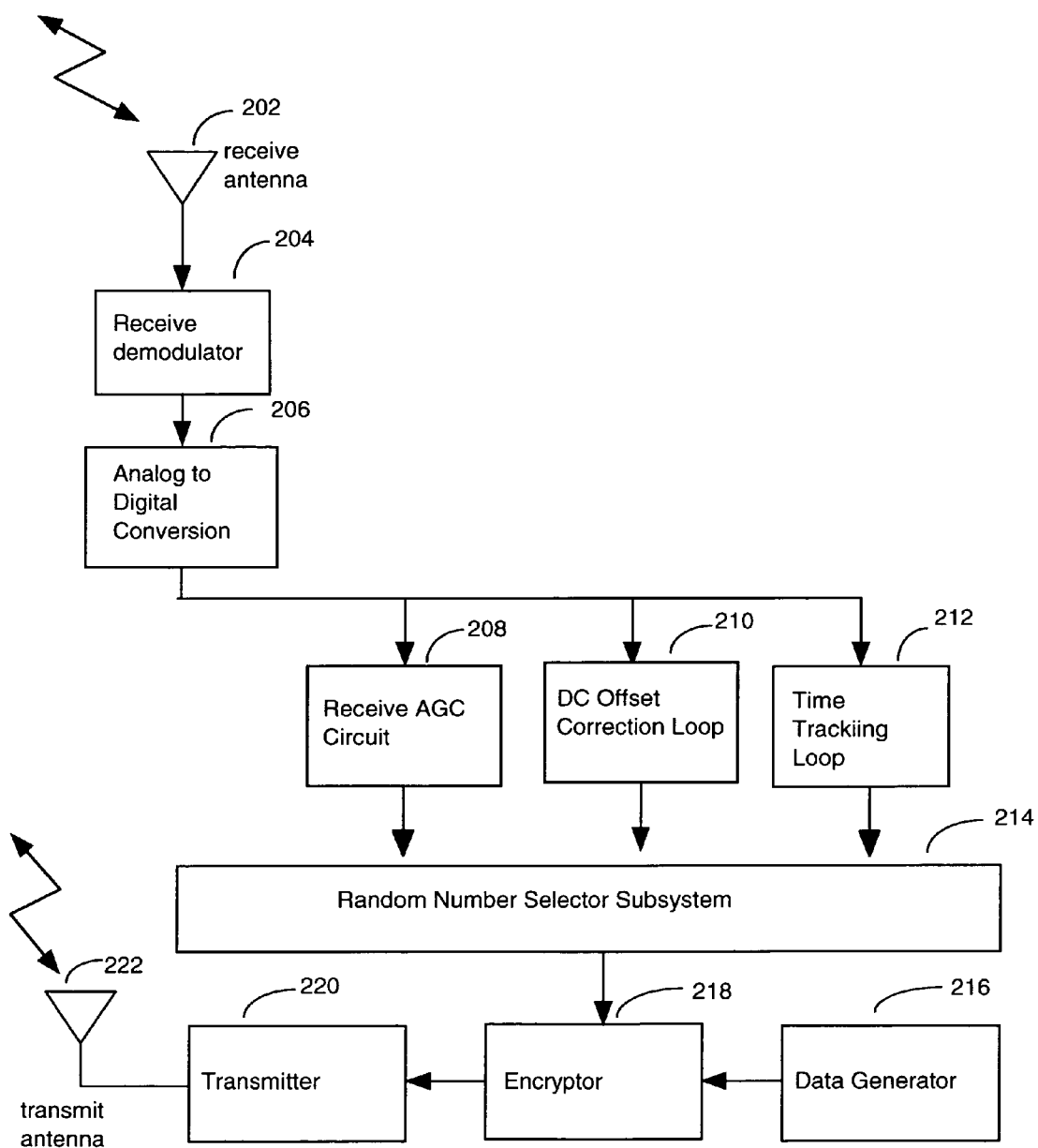
FIG. 2 is a simplified diagram of a partial CDMA phone signal path through CDMA hardware apparatus.

FIG. 2 illustrates a simplified partial signal path within a common CDMA phone receive hardware apparatus. FIG. 2 shows the path of the signal only through the hardware used by the invention to generate random data.

Antenna 202 is a transducer that converts RF (radio-frequency) fields into (alternating current) AC or vice-versa. A receive antenna intercepts RF energy and delivers AC to electronic equipment. The received analog signal reaches antenna element 202, and is downconverted to a baseband analog signal by the receive demodulator element 204. After downconversion, the signal passes to an Analog to Digital Converter element 206.

The Analog to Digital Converter circuit element 206 converts the demodulated analog signal to a digital signal, and performs additional signal processing. During analog to digital conversion, a small Direct Current (DC) offset is introduced into the signal. After the signal is converted, the digitized signal passes simultaneously to the Receive AGC circuit element 208, the DC Offset Correction Loop element 210, and the Time Tracking Loop element 212 within the phone where random bits of data are generated each time a frame of data is received. Each newly generated bit of random data is input to Random Number Selector Subsystem element 214.

Random Number Selector Subsystem 214 is comprised of digital shift registers, which generate a new random number each time they are fed with new random bits and shifted. In the exemplary embodiment, the action of feeding and shifting occurs every 20 milliseconds. It will be understood by one skilled in the art that the principles described can be used to provide random bits at other time intervals. A new random number is supplied to Encryptor element 218 every 20 milliseconds.

Normal unencrypted wireless transmission data is readied for encryption by Data Generator element 216. Normal transmission data may include digitized voice or other communications data. The unencrypted data generated by Data Generator element 216 passes to Encryptor element 218. Encryptor element 218 employs data encryption processes which use the pool of random numbers produced by Random Number Selector Subsystem 214 to encrypt the normal data. The encrypted data output of Encryptor 218 passes to Transmitter element 220.

Transmitter element 220 modulates the encrypted signal and processes it for transmission by the transmit antenna element 222.

Element 222 is the apparatus transmit antenna. Transmit antenna element 222 is fed with the modulated encrypted signal and generates an RF field.

Figure 3:
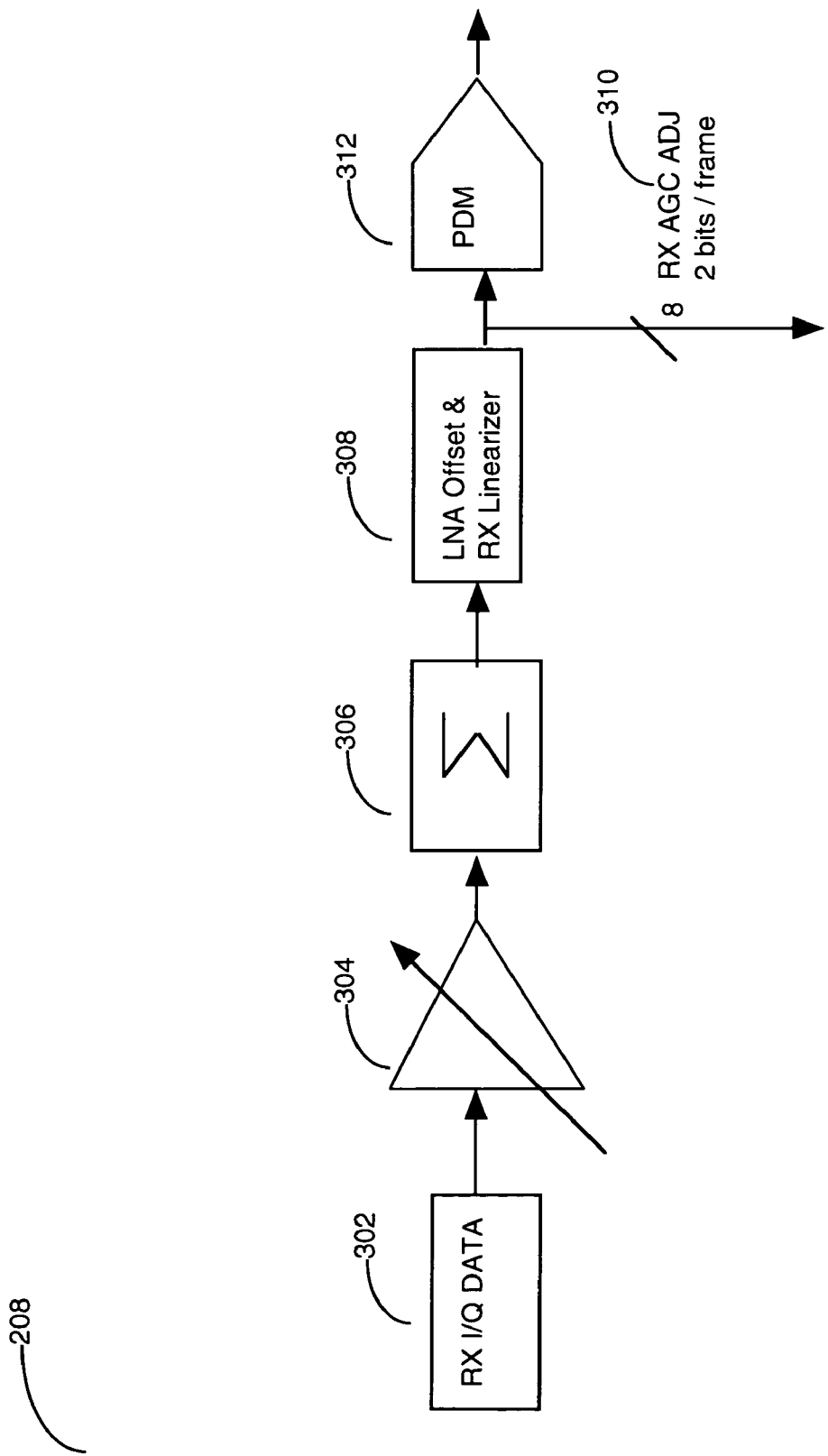
FIG. 3 is an apparatus diagram of a Receive Automatic Gain Control Circuit.

FIG. 3 illustrates the apparatus employed in the exemplary embodiment of the present invention to generate 2 random bits of data from the demodulated digital receive signal input to the Receive AGC 208 every 20 milliseconds. Element 302 illustrates the received I/Q data input path passing to the AGC circuit. I/Q data refers to the In phase and Quadrature phase data samples produced by Quadrature Phase Shift Keying (QPSK) demodulation. The AGC circuit functions to provide a constant energy signal for demodulation. In so doing, AGC 208 produces a random variable intermediate output, known as a Receive AGC Adjusted bits (RX AGC ADJ) 310, from the raw chip level input I/Q samples 302. In CDMA technology, time is often measured in units of chip, where CDMA frequency is 1.2288 MHz, 1 chip=1/(1.2288 MHz)=813.8 nanoseconds.

In gain stage element 304, the received signal is multiplied by a gain value. The gain value varies depending on parameters of the wireless phone hardware. Gain values vary in accordance with internal number representations of hardware components. The range of numbers represented within a component is determined by the number of bits allocated to represent the value. For example, the range of a component 4 bit number may be −7 to 7, while the range of an 8 bit microprocessor would be −128 to 128. If the range of the component values does not match the range of wireless phone controlling microprocessor devices, the values are scaled up or down in order to use the full value range of the controlling microprocessor, so that information is not lost.

Summer element 306, sums the I/Q sample with previous samples, every 20 milliseconds. The signal is passed to Low Noise Amplifier (LNA) and Receive Linearizer element 308, which in the exemplary embodiment produces 8 RX AGC ADJ bits every 20 milliseconds. Element 308 also linearizes the signal for input to Pulse Density Modulator (PDM) element 312.

PDM 312 converts the digital signal to analog for use by other CDMA hardware not involved in random number generation.

The two least significant bits (LSB) of RX_AGC_ADJ dither in a manner corresponding to the instantaneous variations of white noise in the received signal. It can be shown that these two bits are mathematically random because they are derived from mathematically random white noise.

The random bits generated by the Receive AGC are fed to the Random Number Selector Subsystem 214.

Figure 4:
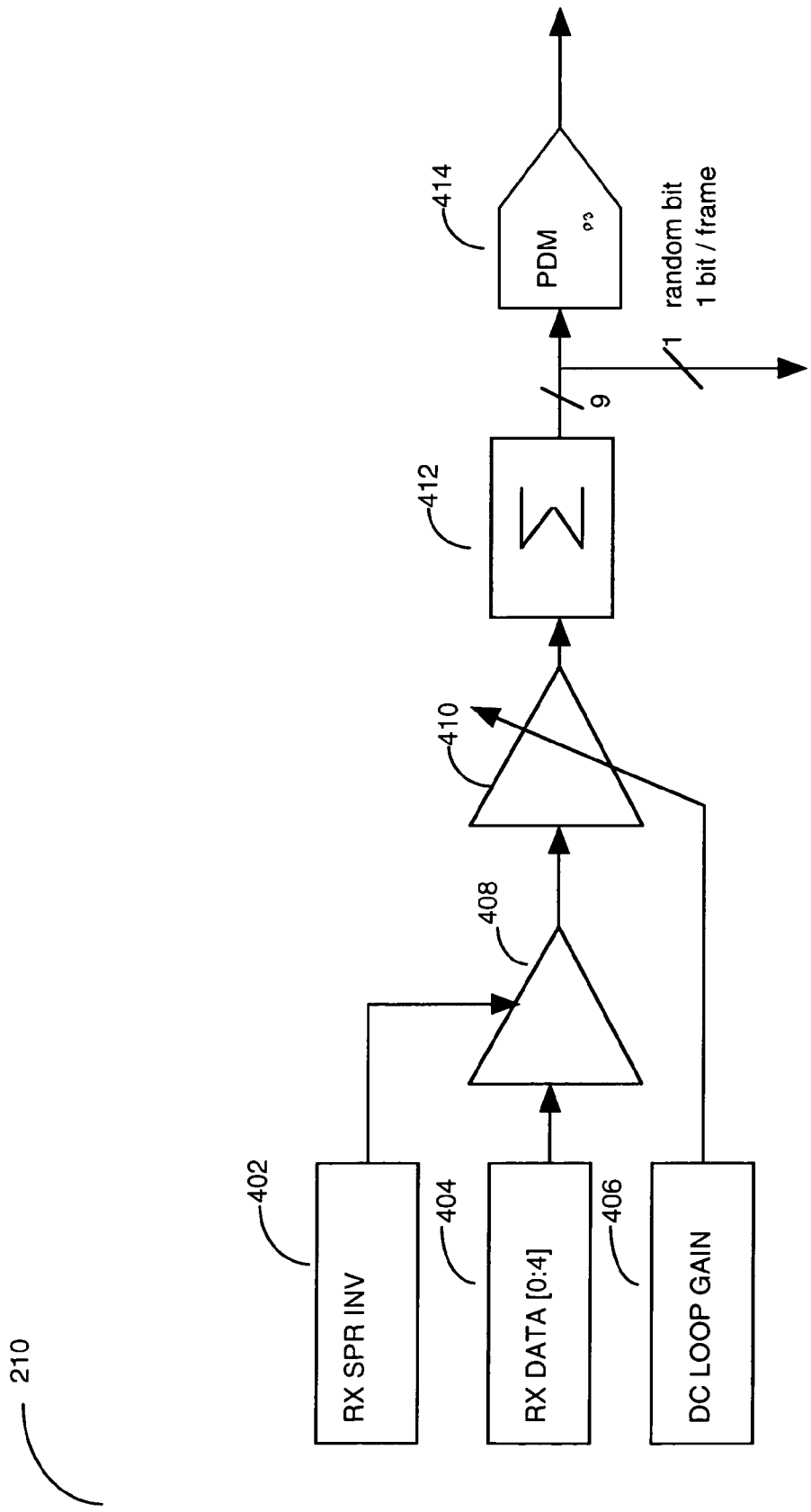
FIG. 4. is an apparatus diagram of an I/Q DC Offset Correction Loop.

FIG. 4 illustrates the apparatus employed by the exemplary embodiment of the present invention to generate 1 random bit of data from the demodulated digital receive signal input to the DC Offset Correction Loop every 20 milliseconds. The DC Offset Correction Loop functions to correct for I/Q offset introduced by the analog to digital conversion process. After the input signal passes through the DC Offset Correction Loop, the I/Q offset has a mean value of zero.

RX DATA, element 404 inputs the received I/Q data to DC Offset Correction Loop 210.

Receive spectral inversion bit generator 402 provides the receive spectral inversion bit input to DC Offset Correction Loop 210. The spectral inversion bit takes a value of 1 or 0. The spectral inversion bit is used to extract the I and Q components from QPSK modulated data.

DC Loop Gain element 408 is the first gain stage of the DC Offset Correction Loop 210, which multiplies the input receive signal by the value of the spectral inversion bit. The multiplied output produces the I and Q components of the received signal.

Gain stage element 410 is the second gain stage of DC Offset Correction Loop 210. Gain stage element 410 multiplies the received signal by a DC Loop gain value. The DC Loop gain value varies depending on parameters of the CDMA hardware. Gain values vary in accordance with internal number representations of hardware components. The range of numbers represented within a component is determined by the number bits allocated to represent the value. For example, the range of a component 4 bit number may be −7 to 7, while the range of an 8 bit microprocessor would be −128 to 128. If the range of the component values does not match the range of wireless phone controlling microprocessor devices, the values are scaled up or down in order to use the full value range of the controlling microprocessor, so that information is not lost.

Summer element 412 sums the multiplied I/Q sample with previous samples, every 20 milliseconds. Element 412 produces a 9 bit value for input to Pulse Density Modulator (PDM) element 414.

PDM 414 converts the offset corrected digital signal to analog for use by other CDMA hardware not involved in random number generation.

In the exemplary embodiment, DC Offset Correction Loop is used for the generation one bit of random data every 20 milliseconds, by extracting the least significant bit (LSB) of the summed value produced by summer 412. The LSB of the 9 bit sum is truly random, as when quantized, it takes on the instantaneous variations of the DC offset component of the input signal.

The random bits generated by the DC Offset Correction Loop are fed to the Random Number Selector Subsystem 214.

Figure 5:
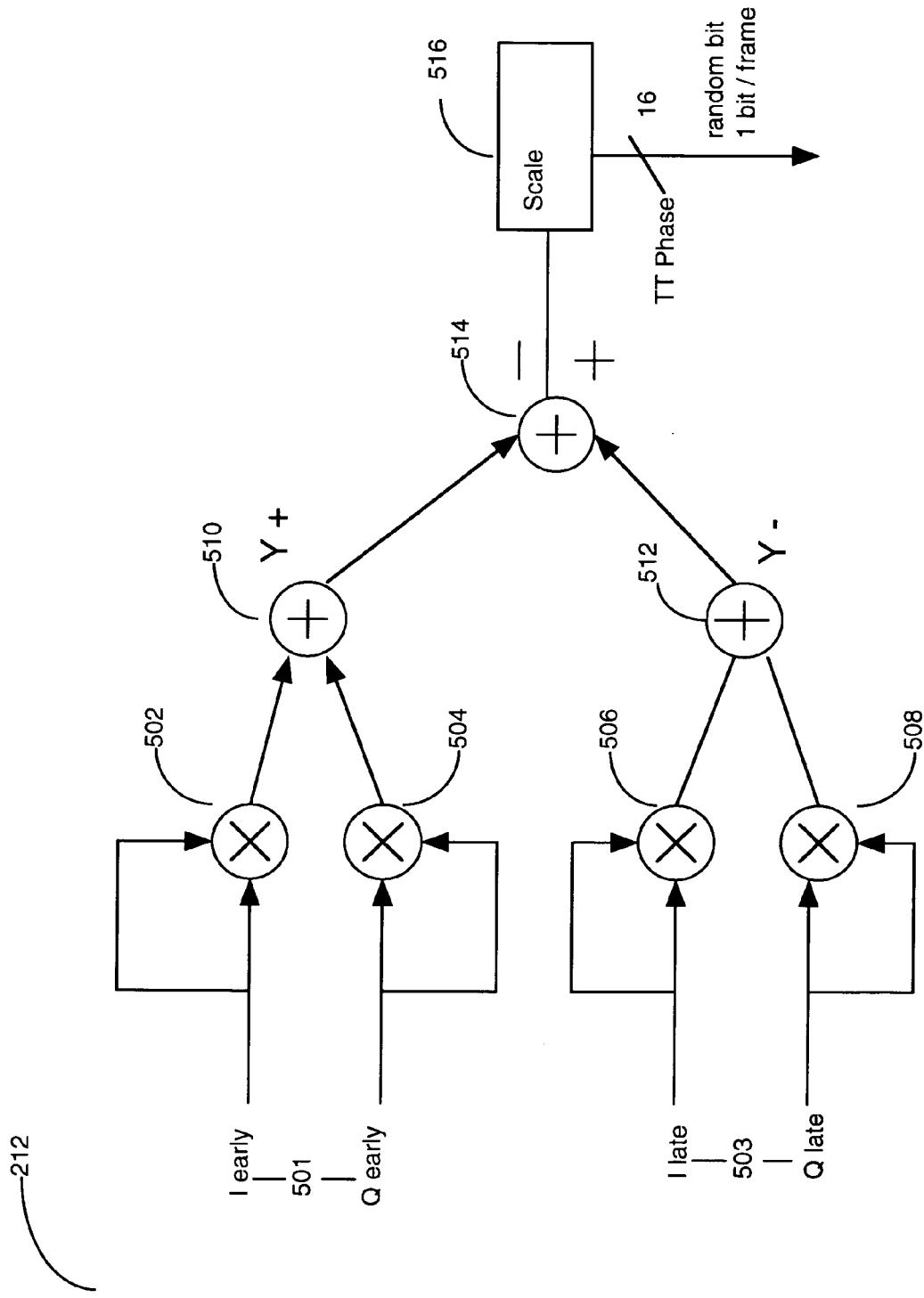
FIG. 5 is an apparatus diagram of a Time Tracking Loop.

FIG. 5 illustrates the apparatus employed by the exemplary embodiment of the present invention to generate 1 random bit of data from the demodulated digital receive signal input to the Time Tracking Loop 212 every 20 milliseconds. The Time Tracking 212 loop functions to track variations in the receive signal propagation delay over time. The propagation delay in a received CDMA signal is not the same for every bit, and varies randomly.

To track the randomly varying propagation delays, the Time Tracking loop receives each I/Q sample received and advances it by one half chip to produce the early I/Q sample 501, while delaying it by one half chip to produce the late sample 503.

The early samples (502–504) and late samples (506–508) are squared in multipliers 502, 504, 506, 508. The squared early I and Q samples are added in summer 510 to produce the energy in the early sample. The squared late I and Q samples are added in summer 512 to produce the energy in the late sample. Subtractor 514 provides the energy difference of the early and late samples to scaling element 516.

Scaling element 516 scales the energy value difference to produce a time tracking phase value. In the exemplary embodiment, the time tracking phase value is a 16 bit number. It can be shown that the LSB bits of the phase value is mathematically random because it is derived from the mathematically random propagation delay inherent in the received signal.

The random bits generated by the Time Tracking Loop are fed to the Random Number Selector Subsystem 214.

Although the present invention is described in the context of generating continues mathematically random data by using the receive AGC circuit, DC Offset loop, and Time Tracking Loop to exploit random characteristics of CDMA signals, one skilled in the art will understand that the teachings of the present invention are readily extended to other wireless communications hardware and signal characteristics such as frequency tracking loops, searcher processes, thermal noise etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An encryption system, comprising:
    a random number selector subsystem for generating random numbers from adjusted data bits of a Receive Automatic Gain Control circuit, wherein said adjusted data bits are generated from said Automatic Gain Control circuit operating on a received signal; and
    an encryptor for encrypting a signal using said random numbers.

2. An encryption system, comprising:
    a random number selector subsystem for generating random numbers from instantaneous variations of the DC offset component of the input signal, wherein said variations are generated from said DC Offset Correction Loop circuit operating on a received signal; and
    an encryptor for encrypting a signal using said random numbers.

3. An encryption system, comprising:
    a random number selector subsystem for generating random numbers from variations in the receive signal propagation delay over time, wherein a CDMA Time Tracking Loop circuit is operating to track said variations in the receive signal propagation delay over time; and
    an encryptor for encrypting a signal using said random numbers.

* * * * *